Dec. 13, 1960     R. P. ATKINSON ET AL     2,964,132
LUBRICATION SYSTEM FOR A TURBINE ENGINE
Filed May 28, 1957     3 Sheets-Sheet 1
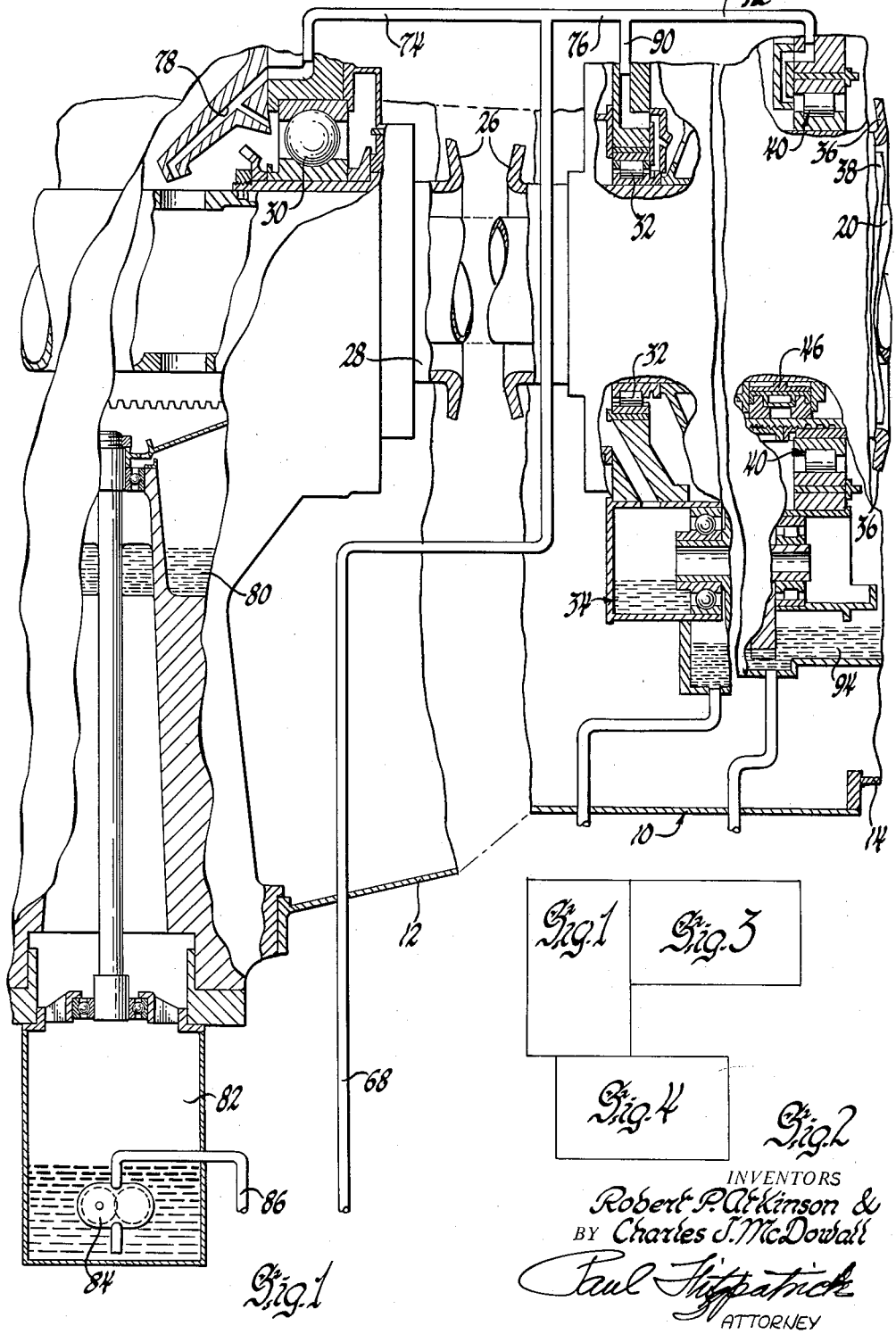
INVENTORS
Robert P. Atkinson &
BY Charles J. McDowall
Paul Fitzpatrick
ATTORNEY

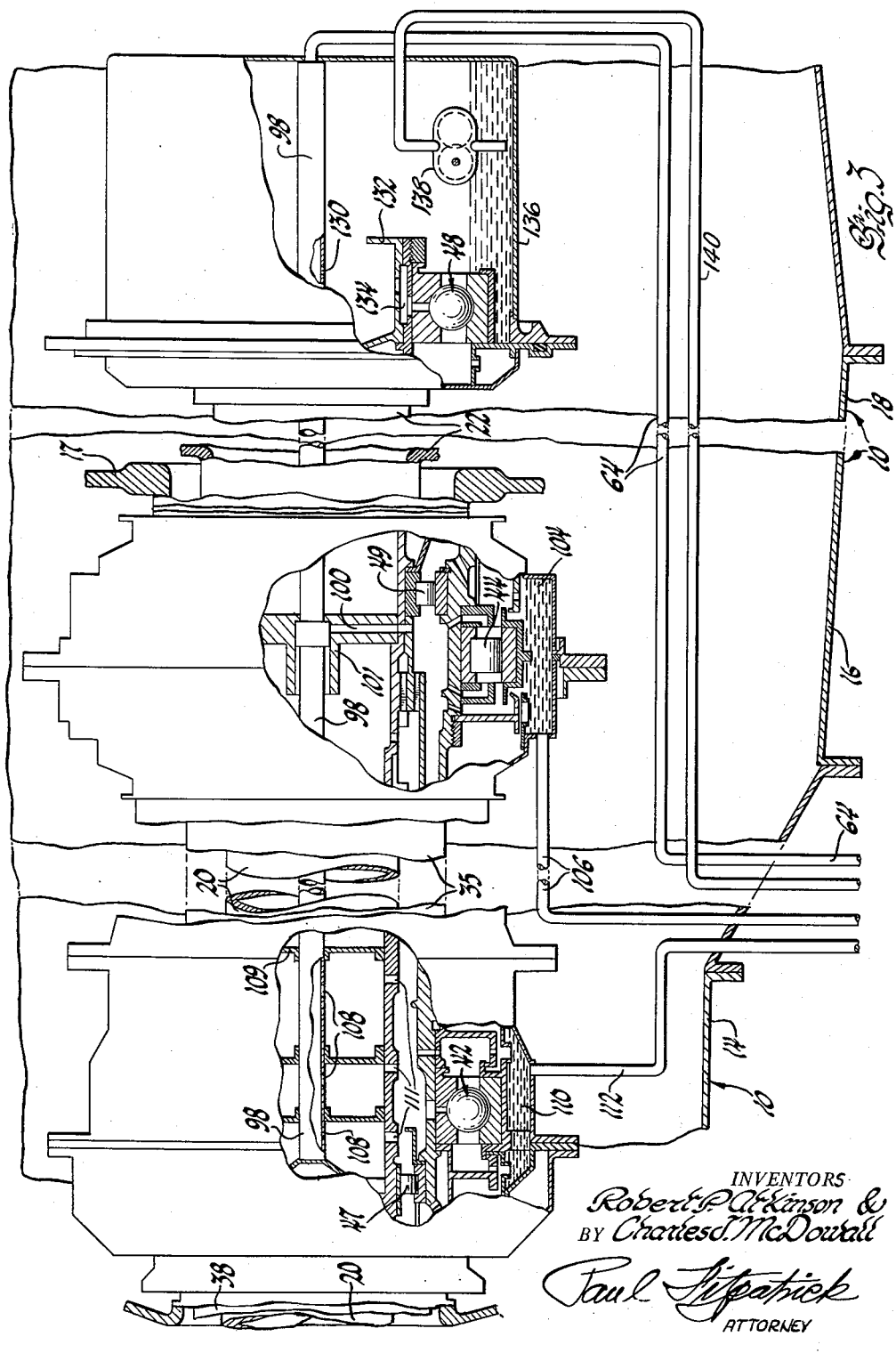

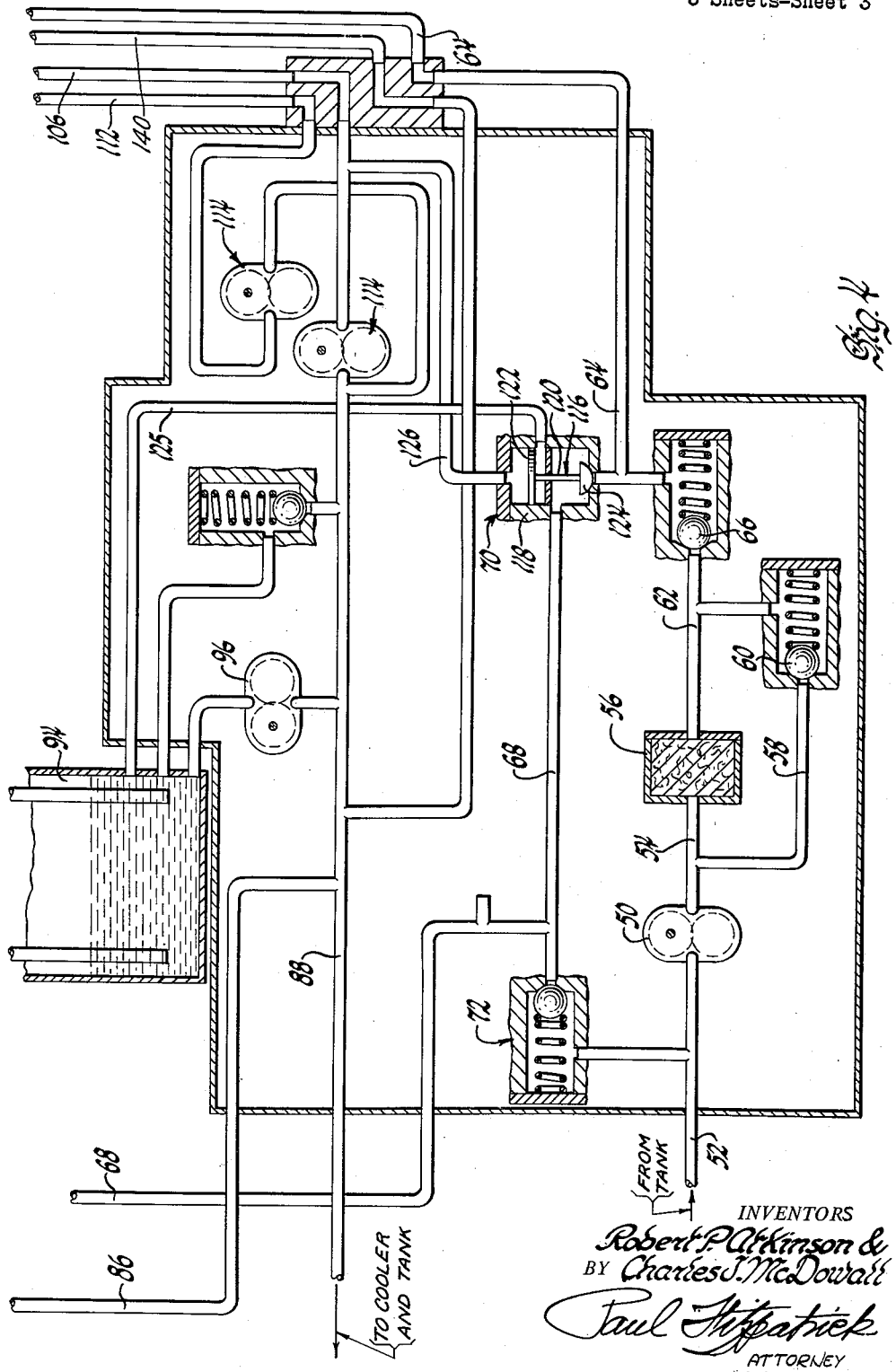

United States Patent Office 2,964,132
Patented Dec. 13, 1960

2,964,132

LUBRICATION SYSTEM FOR A TURBINE ENGINE

Robert P. Atkinson and Charles J. McDowall, Indianapolis, Ind., assignors to General Motors Corporation, Detroit, Mich., a corporation of Delaware Filed May 28, 1957, Ser. No. 660,501

9 Claims. (Cl. 184—6)

The present invention relates to a lubrication system for a turbine type engine and more particularly for such an engine which includes compressor, combustion, and turbine sections. Such engines commonly utilize a power shaft which extends throughout the length of the engine and which shaft is supported by a plurality of bearings at various points along its length. The power shaft is driven, directly or indirectly, by the turbine and similarly in turn drives the compressor and various engine accessories.

In all such turbine engines it is necessary to provide lubricant under pressure to the various bearings supporting said shaft. In providing lubricant it is desirable that the pressure drop across each bearing be the same in order that each bearing is provided with an equal and sufficient amount of lubricant. It is apparent, therefore, that if the pressure drop is greater across one bearing than another the lubricant supplied to that bearing will be greater than is the case with the bearing having a lower pressure drop thereacross.

Heretofore, it has been difficult to insure a relatively equal amount of lubricant being supplied to the various shaft supporting bearings due to the rather great variations in the air pressure surrounding said bearings. For instance, the air pressures acting on the bearings supporting the forwardmost and rearmost ends of said turbine shaft are less than those at certain of the intermediate bearings disposed in higher air pressure zones within the engine.

It is therefore an object of the present invention to provide a turbine lubricating system in which the lubricant pressure drop across all the shaft supporting bearings is substantially equal. The substantial equalization of pressure drops across the various shaft bearings is achieved by providing a unique lubricant supplying system which is adapted to establish a basic lubricant pressure corresponding to the desired pressure drop across all bearings and which system is further responsive to the air pressure surrounding the high pressure bearings in such a way that the latter bearings are supplied with the same amount of lubricant as the lower pressure bearings supporting the shaft.

More specifically, it is an object of the present invention to provide a turbine shaft lubricating system which includes a valve differentially responsive to the air pressure surrounding the high pressure bearings and to the pressure of the lubricant being supplied to the low pressure bearings whereby the resultant pressure differential across all of the shaft supporting bearings will be substantially equal.

The details as well as other objects and advantages of the present invention will be apparent from the description which follows.

In the drawings:

Figure 1 is a partially sectioned view of the forward end of a turbine engine;

Figure 2 is a block diagram indicating the relationship of the remaining figures of the drawing;

Figure 3 is a partially sectioned view of the intermediate and rear portions of the turbine engine; and Figure 4 is a diagrammatic view of the turbine lubricating system.

The turbine engine does not, per se, constitute the subject of the present invention and may be of any well known type. Likewise the details of the various low and high pressure shaft supporting bearings are not, except as hereinafter described, a part of the present invention. The turbine and its components will, therefore, be described only in such detail as is necessary to an understanding of the present unique lubricating system.

The turbine engine is shown generally at 10 and includes a low pressure compressor section 12, a high pressure compressor section 14, a combustion section 16, and a turbine section 18. Turbine section 18 includes a high pressure turbine 17 and a low pressure turbine 22, the latter being coupled through a central shaft 20 with a mechanism for driving a propeller, not shown. The present invention is in no way limited by the form in which the power of the turbine engine 10 is utilized.

Power shaft 20 extends throughout the length of the engine and is fixed to and rotatably driven by the turbine 22. The low pressure compressor 26 is mounted on a shaft 28 suitably splined to the turbine driven shaft 20. The low pressure compressor shaft 28 is rotatably supported by bearing devices 30 and 32. As already noted, the precise construction of the bearing devices 30 and 32 forms no part of the present invention and it is therefore unnecessary to describe these bearings in any detail. It will suffice to say that the bearings are suitably sealed to prevent the leakage of lubricant therefrom.

Aft of the low pressure compressor 26 is a power take-off device indicated generally at 34 and which is adapted to drive the various engine accessories. Bearing 32 rotatably supports shafts 20 and 28 within device 34. At this point it should be noted that the bearings supporting the low pressure compressor 26 as well as the accessory power take-off mechanism 34 are in a low air pressure portion of the engine and the bearings are therefore subjected to essentially the ambient pressures surrounding the aircraft.

The high pressure compressor 36 is suitably splined to the high pressure turbine driven shaft 35 through an intermediate shaft 38 which is supported by a front bearing 40 and a rear bearing 42. Bearing 42 being at the high pressure end of the compressor will be subjected to pressures considerably higher than the ambient pressure acting on the bearings forwardly thereof.

Also in the high air pressure area of the engine is a front bearing 44 rotatably supporting the turbine shaft 35. The rear low pressure turbine supporting bearing 48 being near the exhaust end of the engine is likewise disposed in a zone which is substantially at the ambient atmospheric pressure. A seal 46 and bearings 47 and 49 are disposed between the relatively rotatable turbine shafts 20 and 35.

The low pressure shaft supporting bearings 30, 32, 40 and 48 may be supplied with lubricant under a pressure substantially equal to the pressure drop which is desired to be maintained across the bearings. It is apparent, however, that if the bearings 42, 44, 47 and 49 were supplied with lubricant under the same pressure supplied to the low pressure bearings, the increased pressure against which the lubricant would be working in these high pressure zones would result in a reduced quantity of lubricant being supplied to the high air pressure zone bearings as compared with those in the low pressure zones. The need to obviate the possibility of disparate quantities of lubricant being supplied to the various shaft supporting bearings has led to the development of the present unique lubricating system.

The lubricating system comprises a pressure pump 50 adapted to supply lubricant in excess of the requirements of the engine in order to insure a constant flow of lubricant through the engine bearings. Pump 50 includes an input conduit 52 leading from a suitable supply reservoir or tank, not shown, and an output conduit 54 connecting with a filter 56. In the event the filter 56 becomes fouled and in order to prevent the consequent interruption of the lubricant flow, a filter bypass passage 58 is provided within which a check valve 60 is disposed. Valve 60 is adapted to normally block lubricant flow through the bypass passage except when the pressure therein builds up to a sufficient value to unseat the valve, which pressure is indicative of an impaired filter. A filter output passage 62 communicates with a lubricant supply passage 64 through a check valve 66, the latter preventing the reverse flow or drain of lubricant through the system.

Lubricant supply passage 64 communicates with an additional lubricant supplying passage 68 through a regulating valve 70 of a differential pressure responsive type, described below. Supply passage 68 is adapted to deliver lubricant to the forward or low air pressure part of the engine. A relief valve 72 is connected in parallel with supply passage 68 and pressure pump 50 and may be regulated to maintain the lubricant in passage 68 at a selected base pressure sufficient to provide the requisite pressure drop across the bearing devices 30, 32 and 40 for proper lubricant flow. The pressure set by relief valve 72 determines the basic pressure drop and hence lubricant flow across low pressure bearings and which is the flow to be maintained across all bearings.

Lubricant supplying passage 68 communicates with branch passages 74 and 76, respectively, leading to bearing devices 30, 32 and 40. Branch passage 74 communicates with a bearing supply passage 78 where the lubricant under pressure is sprayed on the bearing surfaces. Lubricant drains from bearing 30 collecting in a basin 80. Basin 80 drains to a reservoir 82 where it is returned by a scavenge pump 84 through a passage 86 to a common return passage 88 leading to a cooler after passing through which the lubricant is again returned to the supply tank. In a similar manner the branch passage 76 delivers lubricant to bearing supply passages 90 and 92 where the lubricant is directed to the various rotating components requiring lubrication within the power take-off device 34 and bearings 32 and 40 and after which the lubricant again drains to a reservoir 94 prior to its return by a scavenging pump 96 to the common return passage 88.

Lubricant supplying passage 64 is adapted to deliver lubricant to the rear portion of the engine. More particularly, supply passage 64 communicates with a passage 98 extending longitudinally within power shaft 20. Inasmuch as passage 64 is supplying lubricant to the high pressure bearings 42, 44, 47 and 49 it is necessary that the pressure in this passage be maintained at a level sufficient to compensate for the higher air pressures within these bearings. Before considering the means whereby the pressure in passage 64 is made responsive to the air pressures within bearings 42 and 44, it should be noted that a radial passage 100 is formed in the passage supporting spider 101 and delivers lubricant to the various portions of bearings 44 and 49 requiring lubrication. Excess lubricant from bearings 44 and 49 is collected in a reservoir 104 from which leads a scavenge lubricant passage 106 communicating with the common scavenge passage 88.

A plurality of axially spaced radial ports 108 are provided intermediate passage supporting members 109 and are disposed adjacent bearings 42 and 47. Corresponding ports 111 are formed in turbine shaft 20 permitting lubricant to flow to the bearings. The excess lubricant from bearings 42 and 47 is collected in a reservoir 110 and returned through a scavenge passage 112 to the common return passage 88. In order to provide a positive flow of the scavenged lubricant a double pump 114 is provided for pumping the scavenge lubricants from passages 106 and 112 facilitating the return of the scavenged lubricant from bearings 42 and 44 to the cooler and lubricant supply tank.

In order that the pressure of the lubricant in supply passage 64 reflect the high air pressure extent in bearings 42, 44, 47 and 49, the differential pressure responsive regulating valve 70 includes a shiftable element 116 mounted within a casing 118. The slidable valve element 116 includes a stem 120 disposed between axially spaced land portions 122 and 124. The low pressure bearing lubricant supply passage 68 communicates with valve casing 118 intermediate the land portions 122 and 124 of the slidable valve member. A passage 126 is tapped off the scavenge oil return passage 106 leading from the high pressure bearing 44. Passage 126 communicates with casing 118 permitting scavenge oil pressure to act on the upper side of land 122 of the valve member 116. Inasmuch as the scavenge oil within bearing 44 is exposed to the high air pressure within the bearing, the pressure of the scavenge oil will be indicative of the magnitude of the air pressure surrounding such bearings. A passage 125 vents the spaces between land 122 and 124 to reservoir 94.

The regulating valve member 116 is also exposed to the pressure created by pump 50 which, through relief valve 72, is set to achieve the basic pressure drop desired across all of the shaft supporting bearings. Thus the pressure in supply passage 64 is equal to the basic pressure determined by the relief valve 72 plus the pressure of the scavenge oil from the high pressure bearings which latter force acting on valve member 116 must be overcome by the pressure in passage 64 to maintain fuel flow through the valve 70.

To illustrate numerically the functioning of the regulating valve 70, assume that the desired pressure drop to be maintained across all of the bearings is 65 p.s.i. In this case the relief valve 72 will be adjusted to create a pressure of 65 p.s.i. in supply passage 68. Further, assume that the pressure in the air pressure in bearings 42, 44, 47 and 49 is 50 p.s.i. greater than the ambient pressures to which the low pressure bearings 30, 32, 40, and 48 are exposed. Thus the 50 p.s.i. differential between the high and low pressure bearings will be reflected in the force or pressure of the scavenge oil acting on the land 122 of valve member 116 causing the slidable member land 124 to move in a downwardly direction restricting flow through the regulating valve. The pressure in supply passage 64 then will build up to a value, in this instance 115 p.s.i. (65 plus 50) to balance the pressure of the scavenge oil acting on the regulating valve. In this way the regulating valve is continuously responsive to the high air pressure acting on bearings 42 and 44 and will accordingly regulate the pressure in supply passage 64 to insure that the pressure drop across these bearings will be substantially identical with the pressure drop across the low pressure bearings.

As previously noted, the rear low pressure turbine bearing 48 is subjected to substantially ambient pressure. However, it will be observed that bearing 48 is supplied with lubricant from supply passage 98 which is at a considerably higher value that that being supplied by passage 68 to the other low pressure bearings. In order to reduce the pressure supplied to bearing 48 to the proper level, an orifice 130, formed in passage 98, meters a given quantity of lubricant to a spinner 132 adapted to be rotated with the power shaft 20. The lubricant supplied to the spinner 132 is thus reduced to ambient pressure. The spinner 132 communicates with the bearing 48 through a suitable passage network 134. The spinner is designed so that centrifugal force will increase the oil pressure supplied to bearing 48 to the level desired, and in the case of the illustration above this would be 65 p.s.i. The excess lubricant from bearing 48 is returned through reservoir 136 and scavenge pump 138 to a passage 140 communicating with the common return passage 88.

As already suggested the subject lubricating system has been diagrammatically represented and it is apparent that the precise construction of the system components would be varied in accordance with the engine to which it is adapted. It is also to be understood that the high and low pressures which have been referred to do not refer to bearing loadings but to the pressure of oil fed to the jets or orifices which lubricate the bearings. The purpose of the system is to balance the relation of oil pressure to air pressure at the bearing for all bearings regardless of the air pressure so that the pressure difference causing oil flow is the same at all points. Actual flow rates to various bearings vary. This is determined by the size of the jets.

We claim:

1. A turbine engine comprising an output shaft extending longitudinally of said engine, a plurality of bearings for supporting said shaft in low air pressure sections of said engine, a plurality of bearings for supporting said shaft in high air pressure sections of said engine, a source of lubricant, pump means for pressurizing said lubricant, first conduit means for communicating said pump means and said low pressure bearings, second conduit means for communicating said pump and said high pressure bearings, means for regulating the lubricant pressure in said first conduit means to establish a rate of lubricant flow through said low pressure bearings, passage means for returning excess lubricant from said high pressure bearings to said lubricant source, the pressure of said excess lubricant being proportional to the air pressure at said high pressure bearings, and means connected to said second conduit means responsive to the pressure of said excess lubricant for maintaining the pressure of lubricant in said second conduit means higher than the pressure in said first conduit means in proportion to the pressure of said excess high pressure bearing lubricant.

2. A turbine engine comprising an output shaft extending longitudinally of said engine, a plurality of bearings for supporting said shaft in low air pressure sections of said engine, a plurality of bearings for supporting said shaft in high air pressure sections of said engine, a source of lubricant under pressure, first conduit means for communicating said lubricant source with some of said low pressure bearings, second conduit means for communicating said pressure source with said high pressure bearings and the remainder of said low pressure bearings, means for establishing a base pressure in said first conduit means, additional means connected to said second conduit means for maintaining a base pressure in said second conduit means higher than the base pressure in said first conduit means in proportion to the air pressure differential between said high and low pressure bearings, and means associated with said low pressure bearings supplied by said second conduit means for reducing the pressure of the lubricant supplied to said low pressure bearings.

3. A turbine engine comprising an output shaft extending longitudinally of said engine, a plurality of bearings for supporting said shaft in low ambient air pressure sections of said engine, a plurality of bearings for supporting said shaft in high air pressure sections of said engine, a source of lubricant under pressure, first conduit means for communicating said lubricant source with some of said low pressure bearings, second conduit means for communicating said pressure source with said high pressure bearings and the remainder of said low pressure bearings, means for establishing a base pressure in said first conduit means, additional means connected to said second conduit means for maintaining a base pressure in said second conduit means higher than the base pressure in said first conduit means in proportion to the air pressure differential between said high and low pressure bearings, means supplied by said second conduit means reducing to low ambient pressure the lubricant supplied to the low pressure bearings by said second conduit means, and pump means driven by said shaft for increasing the pressure of said low ambient pressure lubricant and supplying said lubricant to said latter low pressure bearings.

4. A turbine engine comprising an output shaft extending longitudinally of said engine, a plurality of bearings for supporting said shaft in low air pressure sections of said engine, a plurality of bearings for supporting said shaft in high air pressure sections of said engine, a source of lubricant under pressure, first conduit means for communicating said lubricant source with some of said low pressure bearings, second conduit means for communicating said pressure source with said high pressure bearings and one of said low pressure bearings, means for establishing a base pressure in said first conduit means, additional means connected to said second conduit means for maintaining a base pressure in said second conduit means higher than the base pressure in said first conduit means in proportion to the air pressure differential between said high and low pressure bearings, a centrifugal pump mounted for rotation upon said shaft proximate said one low pressure bearing, orifice means connected to said second conduit means for reducing to ambient pressure the lubricant adapted to be supplied to said one low pressure bearing and delivering said ambient pressure lubricant to said centrifugal pump, said centrifugal pump increasing said lubricant to substantially said base pressure, and passage means for communicating said centrifugal pump and said one low pressure bearing to supply lubricant thereto.

5. A turbine engine comprising a shaft extending substantially throughout the length of said engine, bearings supporting said shaft including a first bearing operating in a first ambient pressure and a second bearing operating in a second, higher and variable, ambient pressure, means for supplying oil under pressure to the first bearing including a relief valve controlling the pressure of the oil supplied to the first bearing, the supplying means including a pump and a regulating valve supplied thereby responsive to the second ambient pressure to maintain an oil pressure differential across the regulating valve determined by the second ambient pressure, and means connecting the inlet of the regulating valve to the second bearing for supply of oil thereto.

6. A lubricating system for supplying oil to a first bearing operating in a first ambient pressure and a second bearing operating in a second, higher and variable, ambient pressure comprising means for supplying oil under pressure to the first bearing including a relief valve controlling the pressure of the oil supplied to the first bearing, the supplying means including a pump and a regulating valve supplied thereby responsive to the second ambient pressure to maintain an oil pressure differential across the regulating valve determined by the second ambient pressure, and means connecting the inlet of the regulating valve to the second bearing for supply of oil thereto.

7. A lubrication system for delivering oil to a plurality of bearings including a first bearing operating in a first ambient pressure and a second bearing operating in a second ambient pressure, the second ambient pressure being variable and being higher than the first ambient pressure, the system including first discharge means for discharging oil to the first bearing in opposition to the first ambient pressure, second discharge means for discharging oil to the second bearing in opposition to the second ambient pressure, and means for supplying oil to both discharging means at predetermined pressure differentials above the respective ambient pressures comprising means for supplying oil under pressure to the first bearing including a relief valve controlling the pressure of the oil supplied to the first bearing, the supplying means including a pump and a regulating valve supplied thereby responsive to the second ambient pressure to maintain an oil pressure differential across the regulating valve determined by the second ambient pressure, and means connecting the inlet of the regulating valve to the second bearing for supply of oil thereto.

8. A lubrication system for delivering oil to a plurality of bearings including a first bearing operating in a first ambient pressure and a second bearing operating in a second ambient pressure, the second ambient pressure being variable and being higher than the first ambient pressure, the system including first discharge means for discharging oil to the first bearing in opposition to the first ambient pressure, second discharge means for discharging oil to the second bearing in opposition to the second ambient pressure, and means for supplying oil to both discharging means at predetermined pressure differentials above the respective ambient pressures comprising an oil pump having an outlet, a regulating valve having an inlet and an outlet, first conduit means connecting the pump outlet to the second discharge means and the inlet of the regulating valve, a relief valve having an inlet and an outlet, second conduit means connecting the regulating valve outlet to the first discharge means and the relief valve inlet, means in the regulating valve responsive to the second ambient pressure controlling flow from the inlet to the outlet of the regulating valve to maintain a pressure difference between the inlet and outlet determined by the second ambient pressure, and means in the relief valve responsive to the pressure in the second conduit means controlling flow from the inlet to the outlet of the relief valve to maintain a predetermined pressure difference between the pressure in the second conduit means and the first ambient pressure.

9. A turbine engine comprising a shaft extending substantially throughout the length of the engine, bearings supporting said shaft including a first bearing operating in a first ambient pressure and a second bearing operating in a second ambient pressure, the second ambient pressure being variable and being higher than the first ambient pressure, first discharge means for discharging oil to the first bearing in opposition to the first ambient pressure, second discharge means for discharging oil to the second bearing in opposition to the second ambient pressure, and means for supplying oil to both discharging means at predetermined pressure differentials above the respective ambient pressures comprising an oil pump having an outlet, a regulating valve having an inlet and an outlet, first conduit means connecting the pump outlet to the second discharge means and the inlet of the regulating valve, a relief valve having an inlet and an outlet, second conduit means connecting the regulating valve outlet to the first discharge means and the relief valve inlet, means in the regulating valve responsive to the pressures in the first and second conduit means and the second ambient pressure controlling flow from the inlet to the outlet of the regulating valve to maintain a pressure difference between the inlet and outlet determined by the second ambient pressure, and means in the relief valve responsive to the pressure in the second conduit means controlling flow from the inlet to the outlet of the second valve to maintain a predetermined pressure difference between the pressure in the second conduit means and the first ambient pressure.

References Cited in the file of this patent

UNITED STATES PATENTS

| | | |
|---|---|---|
| 2,305,455 | Nemetz | Dec. 15, 1942 |
| 2,425,515 | Davis | Aug. 12, 1947 |
| 2,672,010 | Newcomb | Mar. 16, 1954 |
| 2,693,248 | Gaubatz | Nov. 2, 1954 |
| 2,833,374 | Glasser | May 6, 1958 |